United States Patent
Powers

(10) Patent No.: US 10,795,453 B2
(45) Date of Patent: Oct. 6, 2020

(54) OPTICAL OPEN LOOP POINTING TEST METHOD USING CELESTIAL BODIES

(71) Applicant: BAE SYSTEMS INFORMATION AND ELECTRONIC SYSTEMS INTEGRATION INC., Nashua, NH (US)

(72) Inventor: Michael J. Powers, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 411 days.

(21) Appl. No.: 16/047,072

(22) Filed: Jul. 27, 2018

(65) Prior Publication Data

US 2020/0033955 A1    Jan. 30, 2020

(51) Int. Cl.
    *G06T 7/73*     (2017.01)
    *G06F 3/03*     (2006.01)
    *H04N 5/341*    (2011.01)

(52) U.S. Cl.
    CPC .............. *G06F 3/0304* (2013.01); *G06T 7/73* (2017.01); *H04N 5/341* (2013.01)

(58) Field of Classification Search
    CPC ....... G06F 3/0304; G06F 3/0346; G06T 7/73; G06T 2207/10004; G06T 2207/30192; H04N 5/341
    See application file for complete search history.

(56) References Cited

U.S. PATENT DOCUMENTS

| | | | |
|---|---|---|---|
| 5,905,591 A | 5/1999 | Duncan et al. | |
| 8,401,307 B1 | 3/2013 | Rowe et al. | |
| 9,702,702 B1* | 7/2017 | Lane ................. | G01C 21/025 |
| 2006/0103925 A1 | 5/2006 | Pasternak et al. | |
| 2006/0238861 A1 | 10/2006 | Baun et al. | |
| 2007/0038374 A1 | 2/2007 | Belenkii et al. | |
| 2012/0038933 A1 | 2/2012 | Pillukat | |
| 2013/0265639 A1 | 10/2013 | Batchvarov | |
| 2016/0223326 A1* | 8/2016 | Hillel ................ | G06T 7/80 |

OTHER PUBLICATIONS

International Search Report, PCT/US19/41149, 8 pages, dated Oct. 8, 2019.

* cited by examiner

*Primary Examiner* — Phuoc Tran
(74) *Attorney, Agent, or Firm* — Sand, Sebolt & Wernow LPA; Scott J. Asmus

(57) ABSTRACT

Systems and methods for testing or correcting optical pointing systems are disclosed. An optical pointing system may include an imaging sensor including a field-of-view (FOV) carried by the optical pointing system, at least one collecting device for collecting optical photons and directing the optical photons to the imaging sensor, at least one directing device for directing the at least one collecting device to different pointing vectors, and at least one non-transitory computer-readable storage medium carried by the optical pointing system having instructions encoded thereon that when executed by at least one processor operates to test the optical pointing system by, inter alia, determining a pointing error based, at least in part, on a macro image of a targeted object.

20 Claims, 5 Drawing Sheets

OPTICAL OPEN LOOP POINTING TEST METHOD USING CELESTIAL BODIES

STATEMENT OF GOVERNMENT INTEREST

This invention was made with government support under Sub-Contract No. AdCap Phase 3, awarded by a classified Federal agency. The government has certain rights in this invention.

BACKGROUND

Technical Field

The present disclosure relates generally to pointing systems. More particularly, the present disclosure relates to open loop systems and methods for testing or correcting optical pointing systems. Specifically, the present disclosure relates to open loop systems and methods for determining a pointing error based, at least in part, on a macro image of a targeted object.

Background Information

Generally, optical pointing systems may be utilized to track objects. In order to begin tracking the object, the optical system is typically pointed towards a location in order to acquire the object within its field of view. This is sometimes called 'open loop' pointing, meaning the system is pointed to acquire the object and then track it with a 'closed loop' tracking method such as an imaging sensor. In order to ensure that optical pointing systems are accurately pointing to the targeted objects for acquisition, the optical pointing systems are typically tested to determine pointing errors. However, there are some drawbacks associated with conventional optical pointing system testing systems and methods. For example, optical pointing system testing systems and methods performed in a local or indoor environment suffer from, inter alia, parallax errors. Another drawback relates to the intensity of the object utilized for testing. For example, conventional optical pointing systems typically cannot detect stars, or other objects emitting similar light intensity, due to the design of the systems, filtering, and other reasons.

SUMMARY

Issues continue to exist with systems and methods for testing or correcting optical pointing systems. The present disclosure provides a system and method for testing or correcting optical pointing systems by, inter alia, determining a pointing error based, at least in part, on a macro image of a targeted object.

In one aspect, the present disclosure may provide an optical pointing system comprising, an imaging sensor, at least one collecting device for collecting optical photons and directing the optical photons to the imaging sensor, at least one directing device for directing the at least one collecting device to different pointing vectors, and at least one non-transitory computer-readable storage medium carried by the optical pointing system having instructions encoded thereon that when executed by at least one processor operates to inter alia, determine a pointing error based, at least in part, on a macro image of a targeted object.

The instructions may include determining a position of the optical pointing system, determining an attitude of the optical pointing system, calculating a position of a celestial object, calculating a vector to the celestial object, pointing the optical system along the calculated vector, capturing images of at least a portion of the celestial object within a field of view (FOV) of the imaging sensor, forming a macro image of the celestial object based, at least in part, on the captured images of the celestial object; and determining a pointing error based, at least in part, on the macro image of the celestial object and the celestial object.

In one example, the optical pointing system may further include an inertial navigation system (INS). The instructions may further include determining the position and the attitude of the optical pointing system from the INS.

In one example, the position of the optical pointing system may include latitude, longitude, and altitude information.

In another example, the optical pointing system may further include an inertial measurement unit (IMU) carried by the optical pointing system and an inertial navigation system (INS) operably connected with the optical pointing system. In this example the instructions may further include determining the position of the optical pointing system from the INS and determining the attitude of the optical pointing system from the IMU and the INS by a transfer alignment function, or any other suitable method.

In one example, the instructions may further include determining a centroid of the macro image of the celestial object and comparing the centroid of the macro image to a center of the celestial object to determine the pointing error.

In one example, the calculated vector may be based, at least in part, on an azimuth of the celestial object and an elevation position of the celestial object. In another example, the calculated vector may be based, at least in part, on at least one unit vector.

In one example, the instructions may further include capturing the images of the at least a portion of the celestial object with a step-stare scan. The step-stare scan may be based, at least in part, on the FOV relative to a size of the celestial object. In another example, the images may be captured with a spiral pattern, a raster pattern, or any other suitable scanning pattern. The scan pattern may be formed by calculating multiple offset steps from the primary vector to the center of the celestial object, creating a series of pointing vectors, one for each position in the scan pattern.

In one example, the macro image may be formed from utilizing binary thresholding based, at least in part, on pointer vector positions. In this example, the pointer vector positions may be based on gimbal mirror encoder angles. As the system points at each position in the scan pattern, the system calculates and stores the pointing vector associated with each image in the pattern. These pointing vectors can be used to assemble the macro image. For example, the pointing vectors can be converted into azimuth and elevation angles to determine the placement of each step image within the macro image.

In one example, the celestial object may be the moon. In another example, the celestial object may be the sun. However, the celestial object may be any suitable object.

In another aspect, the present disclosure may provide a method for an optical pointing system comprising determining a position of the optical pointing system, determining an attitude of the optical pointing system, calculating a position of a celestial object, calculating a vector to the celestial object, pointing the optical system along the calculated vector, capturing images of at least a portion of the celestial object within a field of view (FOV), forming a macro image of the celestial object based, at least in part, on the captured images of the celestial object, and determining a pointing error based, at least in part, on the macro image of the celestial object and the celestial object.

The method may further include determining a centroid of the macro image of the celestial object and comparing the centroid of the macro image to a center of the celestial object to determine the pointing error. Instructions for determining a centroid may be used such as instructions for determining center of mass image moments or matched filter pattern matching to determine the position of the celestial object in the macro image relative to the center of the macro image.

The method may further include step-stare scanning the celestial object and forming the macro image utilizing binary thresholding based, at least in part, on pointer vector positions.

In another aspect, the present disclosure may provide systems and methods for testing or correcting optical pointing systems. In one example, an optical pointing system may include an imaging sensor including a field-of-view (FOV) carried by the optical pointing system, at least one collecting device for collecting optical photons and directing the optical photons to the imaging sensor, at least one directing device for directing the at least one collecting device to different pointing vectors, and at least one non-transitory computer-readable storage medium carried by the optical pointing system having instructions encoded thereon that when executed by at least one processor operates to test the optical pointing system by, inter alia, determining a pointing error based, at least in part, on a macro image of a targeted object.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

In accordance with one aspect of the present disclosure, an optical pointing system is provided. In one example, the optical pointing system may include a collection of elements (such as lenses, mirrors, optics, pinholes, or the like) for collecting and redirecting radiated energy (not shown), such as optical photons, together with supporting equipment, (such as power supplies, optical amplifiers or the like), and a recording or capturing mechanism for recording or capturing the collected radiated energy or radiated energetic particles as an image. In one example, the optical pointing system may include multi-core processors or general-purpose graphical processing units (GPGPUs) used for pointing, collecting, and processing. In another example, the pointing, collecting and processing may be accomplished with more than a single system such that a partial processing is done on one or more processors and then subject to processing by one or more external processors.

Figure 1:
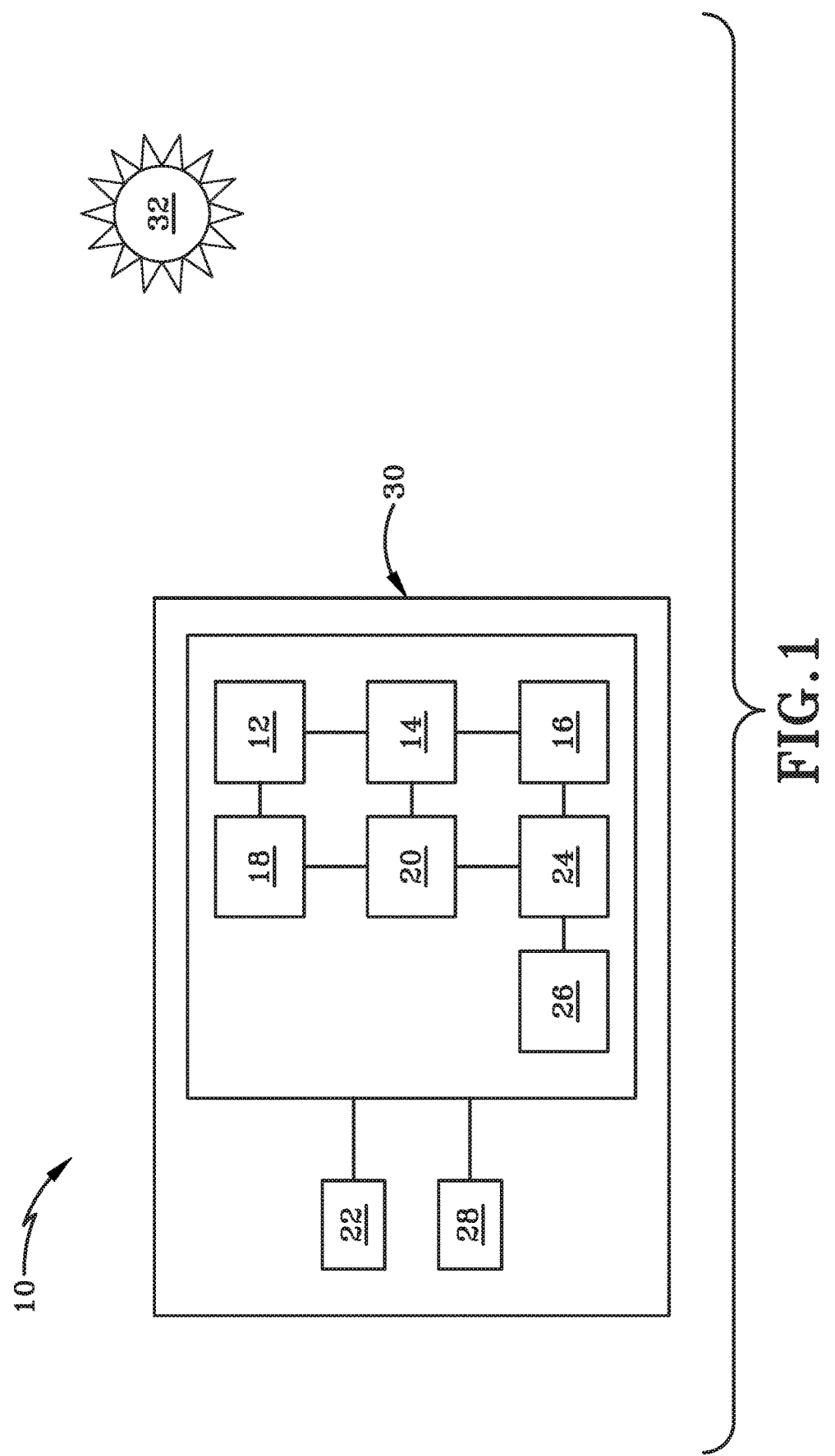
FIG. 1 is a diagrammatic block diagram of one embodiment of an optical pointing system in accordance with the present disclosure.

Referring to FIG. 1, one embodiment of an optical pointing system in accordance with the present disclosure is shown generally at 10. FIG. 1 depicts that the optical pointing system 10 may include at least one imaging sensor 12, at least one collecting device 14, at least one directing device 16, at least one non-transitory computer-readable storage medium 18, at least one processor or microprocessor 20, at least one inertial navigation system (INS) 22, at least one inertial measurement unit (IMU) 24, at least one filtering mechanism 26, and at least one system controller 28. The optical pointing system 10 may be positioned on a platform 30, such as a manned or unmanned airborne vehicle, water-based vehicle, land-based vehicle, or any other suitable vehicle. Further, the term platform may refer to any suitable carrying mechanism that is able to carry the optical pointing system 10. For example, and not meant as a limitation, the platform 30 could be a spacecraft, a manned or unmanned aerial vehicle (UAV), a ground-based vehicle, an underwater vehicle, or a human operator. The at least one computer-readable storage medium 18 may include instructions encoded thereon that when executed by the at least one processor 20 operates to test or correct the optical pointing system 10.

The optical pointing system 10 may be configured to point at an object 32 and capture imagery data related to the object 32. In one example, the object 32 may be a celestial object, such as the moon or the sun; however, the object 32 may be any suitable object. The platform 30 may be at any suitable range from the object 32.

In this embodiment, the at least one imaging sensor 12, the at least one collecting device 14, the at least one directing device 16, the at least one non-transitory computer-readable storage medium 18, the at least one processor 20, the at least one IMU 24, and the at least one filtering mechanism 26 may be carried by the optical pointing system 10 while the at least one INS 22 and the system controller 28 may be physically external yet operably connected to the optical pointing system 10. The INS 22 may be positioned on the platform 30 and may be operably connected to the optical pointing system 10 in any suitable manner such as by a wired or wireless communication link. In one example, the system controller 28 may be positioned externally of the platform 30; however, the system controller 28 may be positioned in any suitable position relative to the optical pointing system 10.

In this embodiment, the imaging sensor 12 may include an imaging focal plane array capable of capturing imagery data within a field of view (FOV) (not shown). The imaging focal plane array may detect optical photons at particular wavelengths and generate an electrical charge, voltage, or resistance in relation to the number of optical photons detected at each pixel. The electrical charge, voltage, or resistance is then measured, digitized, and used to construct an image of the object or scene within the FOV that emitted the optical photons. Although the at least one imaging sensor 12 has been described as including an imaging focal plane array, the at least one imaging sensor 12 may include any suitable imaging sensor, including, but not limited to, a charge-coupled device or a complementary metal-oxide-semiconductor image sensor.

The at least one collecting device 14 may include mirrors, lenses and other optical elements. In one example, the collecting device 14, such as a telescope, is used for collecting the optical photons and focusing the optical photons onto the at least one imaging sensor 12. Although the collecting device 14 has been described as a lens, the collecting device 14 may be any suitable collecting device.

The at least one directing device 16 may include at least one steerable mirror (not shown) for directing the optical photons into the at least one collecting device 14. The at least one steerable mirror may be controlled by the at least one processor 20 to point in various directions to collect optical photons form various vectors. Although the directing device 16 has been described as being at least one steerable mirror, the directing device 16 may be any suitable directing device.

In one example, the at least one directing device 16 may be in operative communication with the at least one collection device 14. The at least one directing device 16 may be positioned optically upstream from the at least one collecting device 14 such that the optical photons emitted from the object 32 or scene first pass through the at least one directing device 16 prior to being sensed by the at least one collecting device 14. In one particular embodiment, the at least one directing device 16 is directly coupled and closely adjacent to the at least one collecting device 14, however these two components may be physically separated and intervening components could be utilized to further effectuate the collection of optical photons on the at least one collecting device 14.

The at least one INS 22 is an electrical sensing device carried by the platform 30 and may be configured to provide the optical pointing system 10 with position and/or orientation information. In one example, the position and/or orientation information of the platform 30 as observed by INS 22 may include, but is not limited to, global positioning system (GPS) information and attitude information. For example, and not meant as a limitation, the INS 22 may provide the optical pointing system 10 with a latitude, longitude, and altitude of the INS 22 as well as a pitch, roll and yaw of the INS 22 relative to a local level frame. Since the INS 22 is physically external to the optical pointing system 10 in this embodiment, the relative alignment between the INS 22 and the optical pointing system 10 may need to be accounted for as described herein. In one example, the optical pointing system 10 may include the at least one IMU 24 and the at least one IMU 24 may provide the optical pointing system 10 with position and/or orientation information such as the latitude, longitude, and altitude of the IMU 24 as well as a pitch, roll and yaw of the IMU 24 relative to the local level frame. The optical pointing system 10 may utilize a transfer alignment function to merge the position and/or orientation information from the INS 22 and the IMU 24 in order to provide an accurate position and/or orientation of the optical pointing system 10 relative to the local level frame.

The at least one filtering mechanism 26 may be positioned along an optical path of the optical photons emitted by the object 32. In one example, the at least one filtering mechanism 26 may be positioned upstream from the imaging sensor 12 and downstream from the at least one collecting device 14. In one example, the at least one filtering mechanism 26 may be an optical filter that is coupled with the collecting device 14. The at least one filtering mechanism 26 may be utilized to filter the optical photons received and processed by the optical pointing system 10. In other words, the optical pointing system 10 may utilize the at least one filtering mechanism 26 to collect and process optical photons from distinct portions of the electromagnetic spectrum, such as the visible portion of the electromagnetic spectrum. Alternatively, the optical pointing system 10 may be configured to collect and process optical photons from distinct portion of the electromagnetic spectrum without utilizing the at least one filtering mechanism 26. This may be accomplished with spectrally selective transmission or reflective optical elements in the directing device 16 or collecting device 14. The imaging sensor 12 may also be constructed to be selectively sensitive to distinct portions of the electromagnetic spectrum. For example, the imaging sensor 12 may utilize a silicon charge-coupled-device (Si CCD) sensor sensitive to the visible spectrum or a mercury cadmium telluride (HgCdTe) sensor sensitive to the mid-Infrared spectrum.

In this embodiment, the at least one system controller 28 may be configured to determine a position of the object 32. In one example, the system controller 28 may be provided with known object locations, such as known locations of celestial bodies from a suitable source such as an astronomical almanac. This celestial body location information, together with the location information of the platform 30 provided by the INS 22, can be used to calculate a pointing vector, to be transferred to the optical pointing system 10. Once the position of the object 32 is determined, the system controller 28 may provide the position information to the optical pointing system 10 in the form of a pointing vector in the local level frame, such as an East-North-Up (ENU) unit vector. The optical pointing system 10 may also use the INS 22 and IMU 22 data to determine its attitude relative to the local level frame (e.g. roll, pitch, and yaw angles). Once the optical pointing system 10 receives the pointing vector to the object 32, and knows its attitude, the optical pointing system 10 may point at the object 32 and collect and process the imagery data.

Figure 2:
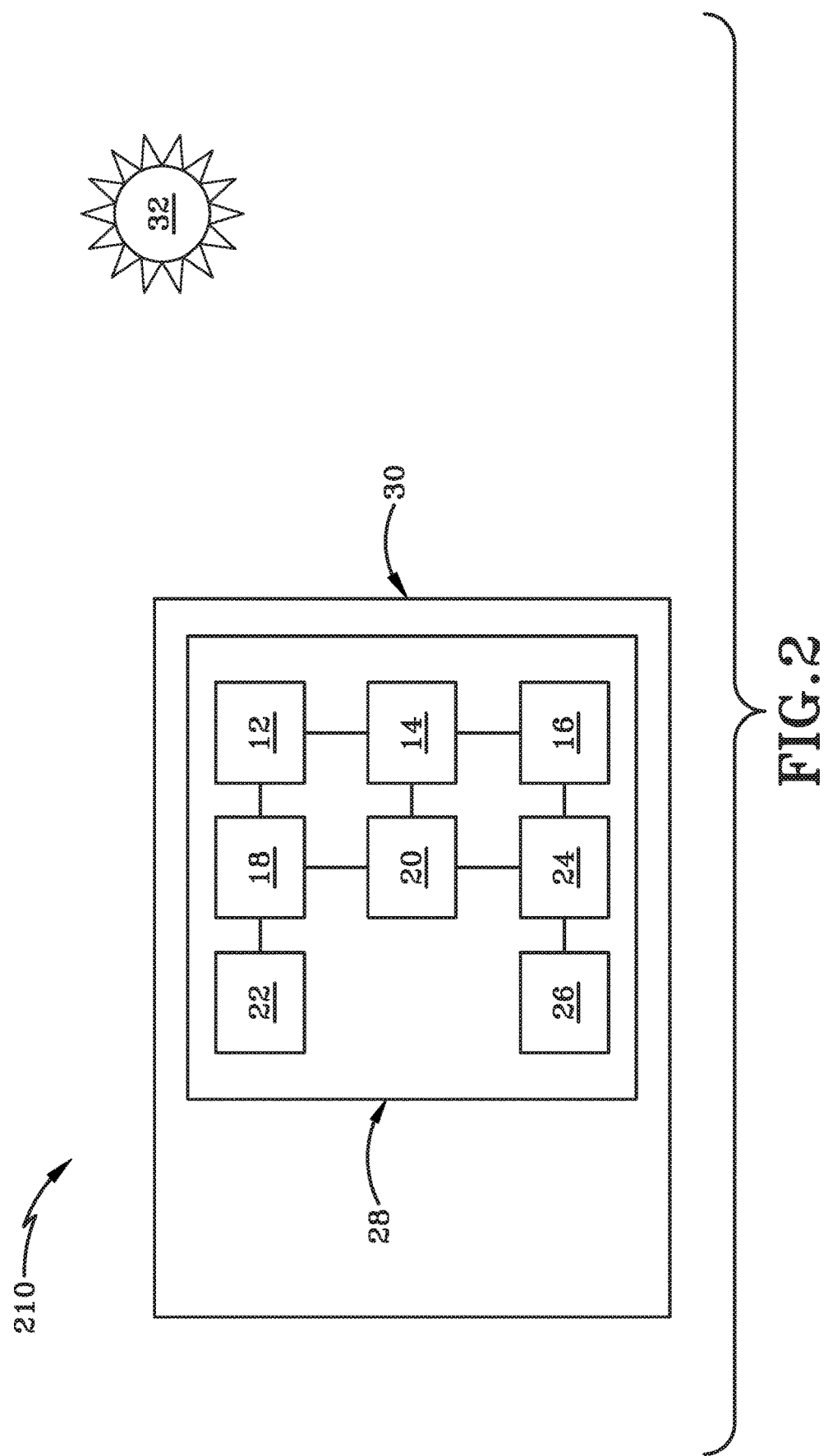
FIG. 2 is a diagrammatic block diagram of one embodiment of an optical pointing system in accordance with the present disclosure.

FIG. 2 is a block diagram of one embodiment of an optical pointing system 210 in accordance with one aspect of the present disclosure. Optical pointing system 210 is substantially identical to optical pointing system 10 in structure and function except as discussed hereafter in greater detail. In this embodiment, the optical pointing system 210 may include the at least one INS 22 and the at least one IMU 24 may be unnecessary. As such, when the optical pointing system 210 receives the position and/or orientation information from the at least one INS 22, the optical pointing system 10 does not need to merge that information with any other information because the at least one INS 22 is not located physically external to the optical pointing system 10.

As stated above, the at least one computer-readable storage medium 18 may include instructions encoded thereon that when executed by the at least one processor 20 operates to test the optical pointing system 10, 210. In one example, the instructions may include determining at least one position of the optical pointing system 10, 210. The at least one position of the optical pointing system 10 may be determined by merging the position and/or orientation information received from the INS 22 and the IMU 24 as stated above. The at least one position of the optical pointing system 210 may be determined by receiving and processing the position and/or orientation information received from the INS 22 as stated above.

The instructions may include determining at least one attitude of the optical pointing system 10, 210. The at least one attitude of the optical pointing system 10 may be determined by merging the position and/or orientation information received from the INS 22 and the IMU 24 as stated above. The at least one attitude of the optical pointing system 210 may be determined by receiving and processing the position and/or orientation information received from the INS 22. Attitude determination may be accomplished by directly reading the INS 22 attitude (roll, pitch, and yaw) if the INS 22 is mechanically coupled to the optical pointing system 210. Alternatively, if the INS 22 and the optical pointing system 10 are not coupled mechanically, the high precision INS 22 attitude can be related to a local IMU 24 attitude on the optical pointing system 10 with a rotational relationship matrix. The rotational relationship between INS 22 and the IMU 24 may be determined by a transfer alignment function which performs angular rate or velocity matching between the sensors in the INS 22 and the IMU 24 to determine the relative rotation between the INS 22 and the IMU 24.

The instructions may include calculating a position of the object 32 at a specific moment in time since the object 32 is in constant relative motion. Calculations of the position of the object 32 are repeated at a rate sufficient to keep the pointing error due to relative motion small relative to the allocations of the specific system. The position of the object 32 may be determined by the system controller 28 and provided to the optical pointing system 10, 210 as stated above.

Figure 3:
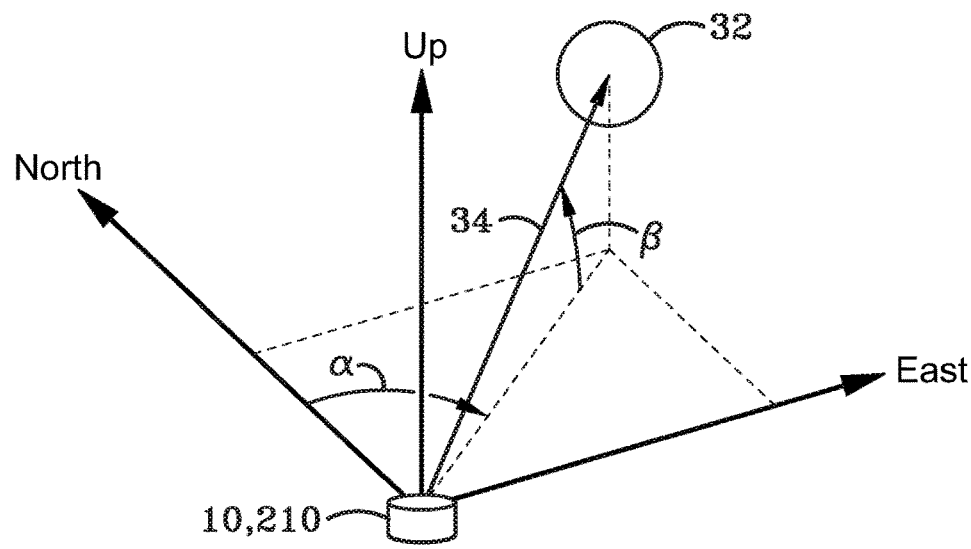
FIG. 3 is a schematic diagram of an exemplary pointing vector to an object, such as the sun, with an Azimuth angle and an Elevation angle calculated in an East-North-Up local level reference frame.

The instructions may include calculating a vector to the object 32. The vector to the object 32 may be determined by the system controller 28 and provided to the optical pointing system 10, 210 as stated above. In one example, the calculated vector may be based, at least in part, on an azimuth of the object 32 and an elevation position of the object 32. If the object 32 is a celestial object, such as the sun, the azimuth of the object 32 and the elevation position of the object 32 may be utilized to calculate a proxy azimuth and elevation position of the sun in any suitable manner. In another example, the calculated vector may be based, at least in part, on at least one unit vector, such as unit vectors in the East-North-Up directions. FIG. 3 is a schematic diagram of an exemplary pointing vector 34 to the object 32, such as the sun, with an Azimuth angle α and an Elevation angle β calculated in an East-North-Up local level reference frame. The position of the object 32, or any other celestial body, may be calculated using a solar pointing function, solar pointing instructions, or in any other suitable manner. Given a location and a time of the system, such as optical pointing system 10, 210, an Azimuth angle and an Elevation angle to celestial bodies may be obtained from star catalogs or any other commonly available reference sources. Although the calculated vector has been described as being based, at least in part on the azimuth and elevation of the object 32 and unit vectors, it is to be understood that the calculated vector may be calculated in any suitable manner.

The instructions may include pointing the optical system 10, 210 along the calculated vector. This may be accomplished by driving the directing device 16 so that the optical pointing system 10, 210 points along the calculated vector to the object 32. In one example, the at least one steerable mirror of the at least one directing device 16 may be moved so the optical pointing system 10, 210 points along the calculated vector to the object 32.

The instructions may include pointing the optical pointing system 10, 210 towards the object 32 and capturing images (not shown) of at least a portion of the object 32 within the FOV of the imaging sensor 12. This may be accomplished by utilizing the at least one imaging sensor 12 to capture the images of the object 32. In one example, the optical pointing system 10, 210 may utilize a step-stare scan to capture the images of the at least a portion of the object 32. In another example, the optical pointing system 10, 210 may utilize a spiral pattern to capture the images of the at least a portion of the object 32. In another example, the optical pointing system 10, 210 may utilize a raster pattern to capture the images of the at least a portion of the object 32. The step-stare scan pattern, the spiral scan pattern, and the raster scan pattern may be based, at least in part, on the size of the FOV of the imaging sensor 12. The scan pattern may be formed by calculating multiple offset steps from the primary vector to the center of the object 32, creating a series of pointing vectors, one for each position in the scan pattern. Although the optical pointing system 10, 210, has been described as utilizing particular scan patterns, the optical pointing system 10, 210 may utilize any suitable scan pattern to capture images of at least a portion of the object 32.

The instructions may include forming a macro image of the object 32 based, at least in part, on the captured images of the object 32 where the term macro image may be defined as an image that encompasses the object 32. In one example, the macro image may be formed by merging the captured images together via binary thresholding, which is a non-linear operation that converts a gray-scale image into a binary image where two levels are assigned to pixels that are below or above a specified threshold value, based, at least in part, on pointer vector positions, which may be based on gimbal mirror encoder angles. As the optical pointing system 10 points at each position in the scan pattern, the optical pointing system 10 calculates and stores the pointing vector associated with each image in the pattern. These pointing vectors can be used to assemble the macro image. For example, the pointing vectors can be converted into azimuth and elevation angles to determine the placement of each step image within the macro image. The threshold value may be any suitable value. Although the macro image was described as being formed by utilizing binary thresholding based on pointer vector positions, the macro image may be formed in any suitable manner.

The instructions may include determine a pointing error based, at least in part, on the macro image of the object 32 and the object 32. In one example, the pointing error may be determined by determining a centroid of the macro image of the object 32 and comparing the centroid of the macro image to a known center of the object 32. Different centroiding functions may be used such as center of mass image moments or matched filter pattern matching to determine the position of the celestial object in the macro image relative to the center of the macro image.

The pointing error may be utilized in various ways, including, but not limited to, being used as a criteria for evaluating the correctness of the optical pointing system 10 calibrations a part of a manufacturing process check or being used to determine correction factors to be applied to the optical pointing calculations in order to improve operational system performance.

For example, and not meant as a limitation, if the pointing error is outside of a pointing error tolerance, which may be any suitable pointing error tolerance, adjustments may be made to the optical pointing system 10, 210 to reduce the pointing error. The pointing error tolerance may be based on a particular application of the optical pointing system 10, 210 and may be any suitable value. In one example, key parameters that may contain error to correct based on the measurement are the mechanical alignments between the imaging sensor 12, the collecting device 14, the directing device, the INS 22, and the IMU 24. For example, if the measurement determines an error in the system roll attitude direction, a correction may be applied to the relative roll orientation between the IMU 24 and the optical components of the optical pointing system 10. These corrections may be applied through mechanical means or through application of a software mathematical correction in the optical pointing system pointing 10 calculations.

The teachings of the present disclosure may be utilized to test or correct the optical pointing system 10, 210. Some drawbacks associated with conventional optical pointing systems is that conventional optical pointing systems typically cannot see stars, or other objects emitting similar light intensity, due to the design of the systems, filtering, or any other reason and conventional systems may have a FOV that is smaller than the object being targeted. One indicator of whether a system may detect a signal coming from an object is a signal-to-noise ratio (SNR) of the system as further described below.

An exemplary optical pointing system 10, 210 may include the following optical system parameters:

optical pointing system 10 nominal wavelength λ=1500 nanometers (nm);

filtering mechanism 26 (optical filter passband width): Δλ=1 nm;

imaging sensor 12 (optical pointing system 10 optical aperture diameter): $d_{aper}$=50 millimeters (mm);

effective focal length of the optical pointing system 10: EFL=2 meters (m);

pixel size: pix=30 μm;

D* Normalized detectivity of imaging sensor 12:

$$Ds := 10^{12} \cdot \frac{cm\sqrt{Hz}}{W};$$

Optical pointing system optical path transmission: Trans=30%;

Imaging Sensor 12 Bandwidth: BW=1000 Hertz (HZ); and

Imaging sensor 12 detector size in terms of number of pixels (n×n): npix=128.

In order to determine whether the optical pointing system 10, 210 may detect a signal coming from an object 32, a signal-to-noise ratio (SNR) typically needs to be greater than one. The SNR of the optical pointing system 10, 210 for Sirius, a star, and the sun may be determined utilizing the following equations:

$$c = 2.99792 \times 10^8 \frac{m}{s} \quad \text{Equation (1)}$$

where c is a constant representing velocity of light in a vacuum;

$$h := 6.626069310^{-34} \cdot joule \cdot sec \quad \text{Equation (2)}$$

where h Planck's constant;

$$k_b := 1.380650510^{-23} \cdot \frac{joule}{K} \quad \text{Equation (3)}$$

where $k_b$ is Boltzmann's constant;

$$A_{aper} := \frac{\pi \cdot d_{aper}^2}{4} = 19.635 \text{ cm}^2 \quad \text{Equation (4)}$$

Where $A_{aper}$ is an aperture area;

$$\Omega_{pix} := \left(\frac{pix}{EFL}\right)^2 = 2.25 \times 10^{-10} \cdot sr \quad \text{Equation (5)}$$

where $\Omega_{pix}$ is a solid angle of pixel instantaneous field of view (ifov);

$$fov >= npix\frac{pix}{EFL} = 1.92 \times 10^{-3} \cdot rad \quad \text{Equation (6)}$$

where fov is angular field of view of the entire imaging sensor 12 array;

$$NEP := \frac{\sqrt{pix^2 \cdot BW}}{Ds} = 9.487 \times 10^{-14} \cdot W \quad \text{Equation (7)}$$

where NEP is noise equivalent power;

$$B_\lambda(\lambda, T) := \frac{2 \cdot h \cdot c^2}{\lambda^5} \cdot \frac{1}{e^{\frac{h \cdot c}{\lambda \cdot k_b \cdot T}} - 1} \quad \text{Equation (8)}$$

where $B_\lambda(\lambda, T)$ is spectral radiance based on Planck's law for a blackbody; and $$\Omega_S(r, d) := \pi \cdot asin\left(\frac{r}{d}\right)^2 \cdot sr \quad \text{Equation (9)}$$

where $\Omega_s$ (r,d) is solid angle of star based on star radius and distance.

The SNR of the optical pointing system 10, 210 for Sirius, a star may be determined utilizing the following information:

temperature of Sirius: $T_{sir}$=11200K;

radius of Sirius:

$$R_{sir} := \frac{2 \cdot 10^9}{2} m;$$

distance to Sirius: $d_{sir}$: =8.14·$10^{10}$ m;

power in a single pixel fov: $P_{sir}$: =$B_\lambda(\lambda, T_{sir}) \cdot \Omega_s(R_{sir}, d_{sir}) \cdot \Delta\lambda \cdot A_{aper} \cdot Trans$=3.234×$10^{-15}$ W; and SNR when the optical pointing system 10, 210 points at Sirius:

$$SNR_{sirius} := \frac{P_{sir}}{NEP} = 0.034.$$

Since the SNR is less than one, Sirius is not sufficiently detectable by the optical pointing system 10, 210. As such, Sirius cannot be used as a source to test the optical pointing system 10, 210 and another source, such as the sun, needs to be utilized.

The SNR of the optical pointing system 10, 210 for the sun may be determined utilizing the following information:
temperature of sun: $T_{sun}$=577K;
radius of sun: $R_{sun}$: =6.957·10$^8$·m;
distance to sun: $d_{sun}$: =1.496·10$^{11}$·m;
power in a single pixel fov: $P_{sunpix}$: =$B_\lambda(\lambda, T_{sun})$· $\Omega_{pix}$·$\Delta\lambda$·$A_{aper}$·Trans=4.878×10$^{-10}$·W; and
SNR when the optical pointing system 10, 210 points at the sun:

$$SNR_{sun} := \frac{P_{sunpix}}{NEP} = 5.142 \times 10^3.$$

It should be noted that because the sun is an extended angular source, which is much larger than the imaging sensor 12 detector pixel angular field of view, the pixel angular field of view may be used as the limiting solid angle $\Omega$ for the calculation instead of the angular size of the star as shown in the calculations for Sirius.

Since the SNR using the sun is much greater than one, the sun is sufficiently detectable by the optical pointing system 10, 210. Even though the sun is sufficiently detectable by the optical pointing system 10, 210, the sun has an angular diameter of approximately 9.3 milliradians (mrad), or approximately 0.5 degrees, which is larger than the FOV of the optical pointing system 10, 210, which is, in one particular embodiment, 1.9 mrad. Thus, if the optical pointing system 10, 210 points along a vector directed at the center of the sun, the imaging sensor 12 only images the center portion of the sun. Since only the center of the sun is imaged, there are no features that can be utilized to determine how well centered the optical pointing system 10, 210 is on the object 32.

Figure 4:
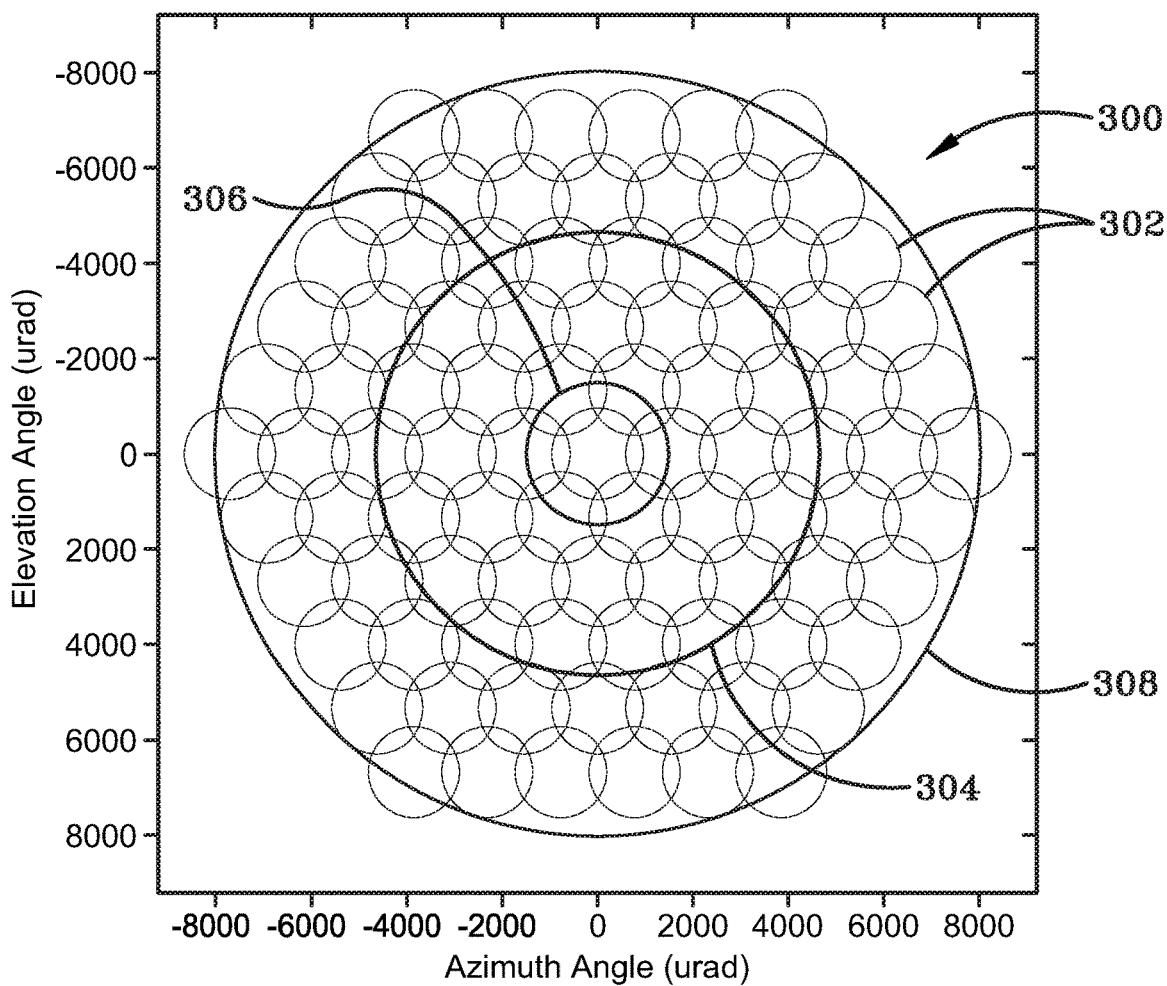
FIG. 4 is an exemplary hex close pack (HCP) solar scan pattern.

Therefore, the optical pointing system 10, 210 may be point in a stepped manner around the sun and capture images of at least a portion of the sun at each step. In one example, the optical pointing system 10, 210 may utilize a hex close pack (HCP) spiral scan. FIG. 4 is an exemplary 91 step HCP solar scan pattern 300. Each circle 302 represents a single captured image FOV, which is 1.92 mrad in diameter or 0.96 mrad in radius. The scan step size is eighty percent the imaging sensor 12, or detector, FOV (0.8*1.92 mrad=1.536). Circle 304 image is the solar disk of the sun. Circle 306 and circle 308 are reference circles to allow estimation of the scan area.

As stated above, and as shown in FIG. 4, the optical pointing system 10, 210 may utilize the HCP spiral scan. The optical pointing system 10, 210 may determine a radius of search area for the HCP scan. In one example, the radius of the search area needs to be larger than a radius of the sun, which is approximately 4.6 mrad, plus an allowance for a tolerance of the optical pointing system 10, 210 to ensure the resulting macro image fully encompasses the sun. The optical pointing system 10, 210 may determine the number of rings in the HCP spiral scan. As shown in FIG. 4, the number of rings in the solar scan pattern is eighty percent of the imaging sensor 12, or detector, angular field of view in order to provide at least some overlap between the captured images. The optical pointing system 10, 210 may determine the number of steps in the HCP spiral scan. As shown in FIG. 4, the number of steps is equal to ninety-one.

The collection of captured images can be stitched together to form a larger macro image of the sun which may be used to test the optical pointing system 10, 210 as described above. The measured pointing error is compared to pointing error allocations, which are application specific. For many applications, pointing error allocations in the range of 0.1 to 10 milliradians are of interest. One of the limitations in the accuracy of the error assessment is the ability to determine the position of the celestial object 32 in the macro image of the celestial object 32. For example, when using the sun as the reference celestial object 32, the solar disk is approximately 9.3 milliradians in diameter and the ability to determine a centroid of the macro image is limited to approximately one percent (1%) of the diameter of the solar disk, or 0.09 milliradians.

Figure 5:
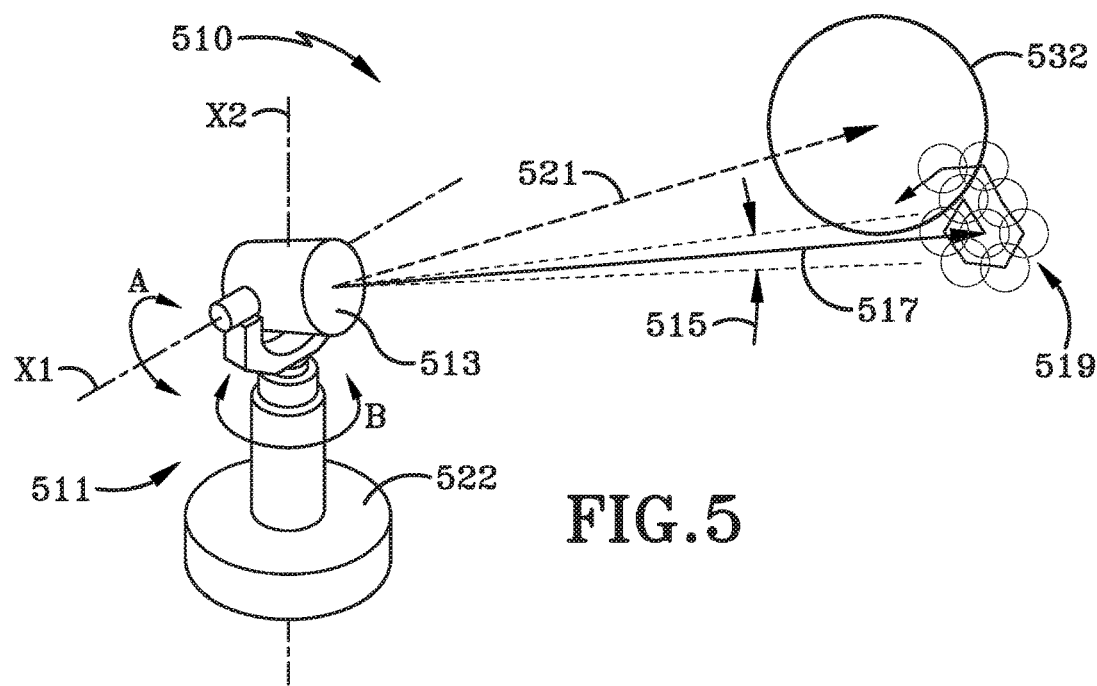
FIG. 5 is a schematic diagram of one embodiment of an optical pointing system in accordance with the present disclosure showing the optical pointing system pointing and scanning the sun.

FIG. 5 is a schematic diagram of one embodiment of an optical pointing system 510 in accordance with the present disclosure showing the optical pointing system 510 pointing and scanning an object 532, which, in this embodiment, is the sun. In this embodiment, the optical pointing system 510 includes a two-axis pointing gimbal 511 which is rotatable about a first axis X1 in a direction as shown by arrow A, such as an Elevation axis, and a second axis X2 in a direction as shown by arrow B, such as an Azimuth axis. The pointing gimbal 511 includes an optical aperture 513 having a field of view 515 (FOV) for pointing along a calculated or measured vector 517 and an INS reference 522 mounted to the optical pointing system 510 to provide the optical pointing system 510 position, time, and attitude information relative to an East-North-Up local level frame. The mechanical orientation of the INS reference 522 relative to the first axis X1 and the second axis X2 is a calibration parameter, which, in this embodiment, has some error associated with it. This error causes the center of a macro image formed by an optical scan pattern (shown partially as 519 in FIG. 5) to be offset from the center of the sun 532, which is shown in FIG. 5 by a true pointing vector 521.

Figure 6:
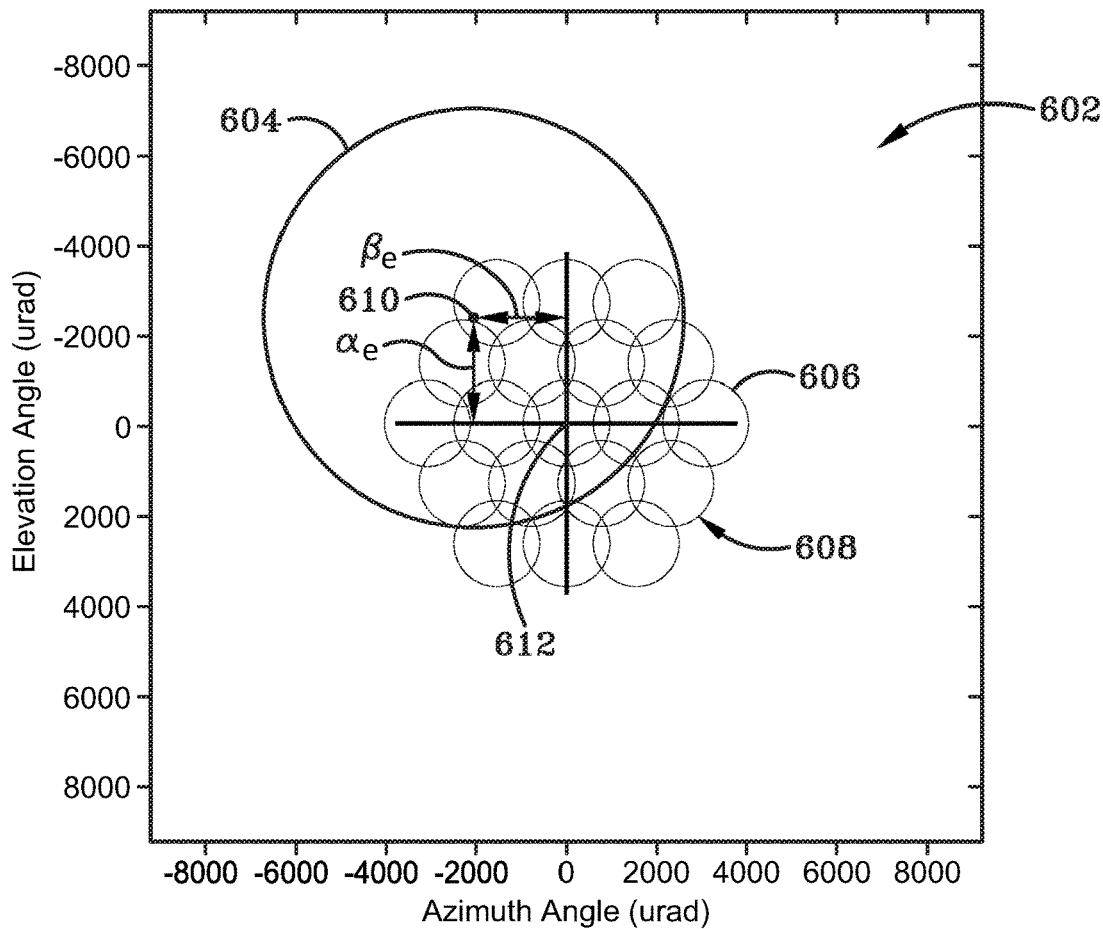
FIG. 6 is an exemplary macro image formed by merging captured images from a scan pattern.

FIG. 6 is an exemplary macro image 602 encompassing a solar disk 604 of the sun formed by merging captured individual scan images 606 from a scan pattern, shown partially as 608 in FIG. 6. The angular error between a center 610 of the solar disk 604 and a center 612 of the macro image 602 is measured to determine an Azimuth angle error value $\alpha_e$ and an Elevation angle error value $\beta_e$. The Azimuth angle error value $\alpha_e$ and the Elevation angle error value $\beta_e$ are used to assess optical pointing system 510 pointing capability and may be used to apply corrections to the optical pointing system 510 calibration to improve the pointing performance of the optical pointing system 510.

Figure 7:
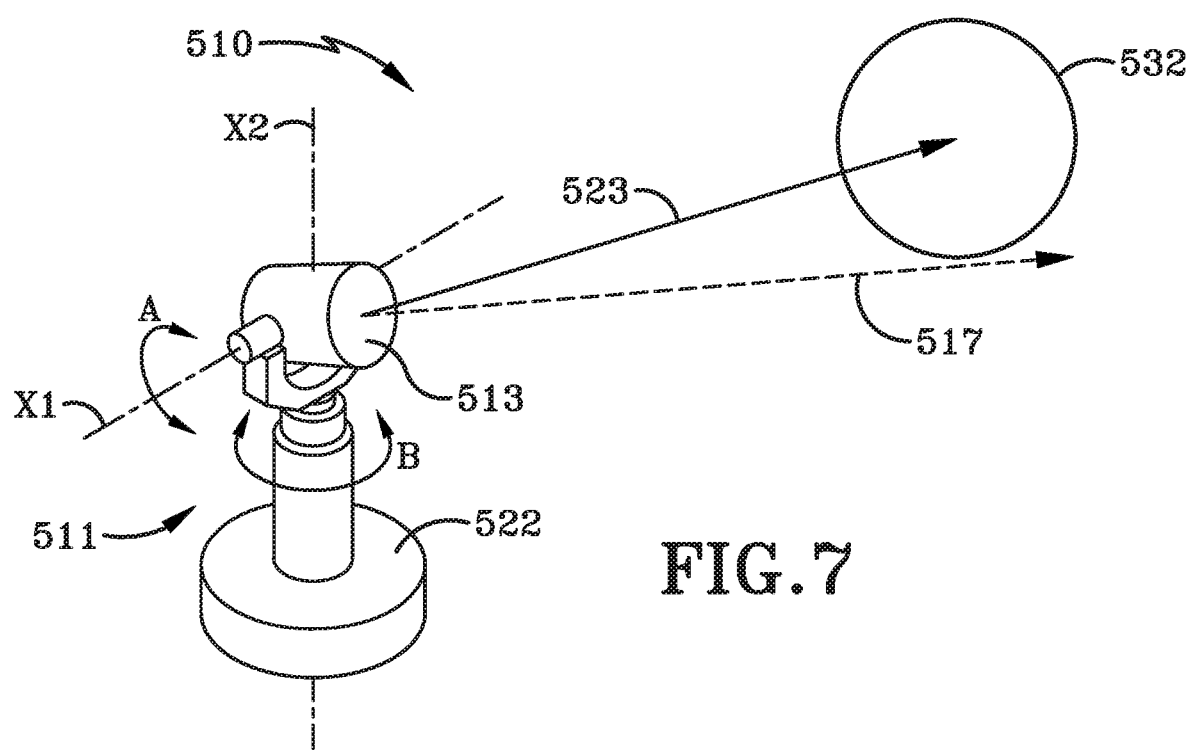
FIG. 7 is a schematic diagram of the optical pointing system of FIG. 5 showing correction of the optical pointing system based, at least in part, on determined pointing errors.

FIG. 7 is a schematic diagram of the optical pointing system of FIG. 5 showing correction of the optical pointing system 510 based, at least in part, on determined pointing errors. More specifically, the determined pointing errors (i.e. the Azimuth angle error value $\alpha_e$ and the Elevation angle error value $\beta_e$) may be used to rotate the pointing gimbal 511 along the first axis X1 and the second axis X2 to improve the pointing performance of the optical pointing system 510. As shown in FIG. 7, the determined pointing errors may be used to point along a corrected vector 523, which is along the true vector 521 of FIG. 5, from the original calculated or measured vector 517, which is shown as a dashed line in FIG. 7.

It is envisioned that the teachings of the present disclosure may be utilized for various applications, including, but not limited to, infrared search and targeting sensors, laser target designator systems, laser communication systems, directed laser countermeasure systems, and directed high energy laser systems.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An optical pointing system comprising:
an imaging sensor;
at least one collecting device for collecting optical photons and directing the optical photons to the imaging sensor;
at least one directing device for directing the at least one collecting device to different pointing vectors; and
at least one non-transitory computer-readable storage medium carried by the optical pointing system having instructions encoded thereon that when executed by at least one processor, the instructions cause the at least one processor to:
determine a position of the optical pointing system;
determine an attitude of the optical pointing system;
calculate a position of a celestial object, wherein the celestial object is the sun;
calculate a vector to the celestial object;
point the optical system along the calculated vector;
capture images of at least a portion of the celestial object within a field of view (FOV) of the imaging sensor;
form a macro image of the celestial object based, at least in part, on the captured images of the celestial object being merged together; and
determine a pointing error based, at least in part, on the macro image of the celestial object and the celestial object to test or correct the optical pointing system.

2. The optical pointing system of claim 1, further comprising:
an inertial navigation system (INS); wherein the instructions further comprise:
determine the position and the attitude of the optical pointing system from the INS.

3. The optical pointing system of claim 2, wherein the position of the optical pointing system includes latitude, longitude, and altitude information.

4. The optical pointing system of claim 1, further comprising:
an inertial measurement unit (IMU) carried by the optical pointing system; and
an inertial navigation system (INS) operably connected with the optical pointing system;
wherein the instructions further comprise:
determine the position of the optical pointing system from the INS; and
determine the attitude of the optical pointing system from the IMU and the INS.

5. The optical pointing system of claim 4, wherein the instructions further comprise:
determine the attitude of the optical system relative to the INS by a transfer alignment function.

6. The optical pointing system of claim 1, wherein the instructions further comprise:
determine a centroid of the macro image of the celestial object; and
compare the centroid of the macro image to a known center of the celestial object to determine the pointing error.

7. The optical pointing system of claim 1, wherein the calculated vector is based, at least in part, on an azimuth of the celestial object and an elevation position of the celestial object.

8. The optical pointing system of claim 1, wherein the calculated vector is based, at least in part, on at least one unit vector.

9. The optical pointing system of claim 1, wherein the instructions further comprise:
capture the images of the at least a portion of the celestial object with a step-stare scan.

10. The optical pointing system of claim 9, wherein the step-stare scan is based, at least in part, on the FOV relative to a size of the celestial object.

11. The optical pointing system of claim 1, wherein the instructions further comprise:

capture the images of the at least a portion of the celestial object with a spiral pattern or a raster scan pattern.

12. The optical pointing system of claim 1, wherein the celestial body requires a signal to noise ratio of greater than one.

13. The optical pointing system of claim 1, wherein the instructions further comprise:
   form the macro image utilizing binary thresholding based, at least in part, on pointer vector positions.

14. The optical pointing system of claim 13, wherein the pointer vector positions are based on based on gimbal mirror encoder angles.

15. The optical pointing system of claim 1, wherein the instructions further comprise:
   adjust the optical pointing system based on the pointing error to reduce the pointing error.

16. The optical pointing system of claim 1, further comprising:
   at least one filtering mechanism positioned along an optical path of the optical photons collected by the at least one collecting device.

17. A method for an optical pointing system, comprising:
   determining a position of the optical pointing system;
   determining an attitude of the optical pointing system;
   calculating a position of a celestial object, wherein the celestial object is the sun;
   calculating a vector to the celestial object;
   pointing the optical system along the calculated vector;
   capturing images of at least a portion of the celestial object within a field of view (FOV);
   (FOV) of an imaging sensor, wherein the FOV of the imaging sensor is smaller than an angular size of the celestial object;
   forming a macro image of the celestial object based, at least in part, on the captured images of the celestial object being merged together; and
   determining a pointing error based, at least in part, on the macro image of the celestial object and the celestial object.

18. The method of claim 17, further comprising:
   determining a centroid of the macro image of the celestial object; and
   comparing the centroid of the macro image to a center of the celestial object to determine the pointing error.

19. The method of claim 17, further comprising:
   step-stare scanning the celestial object.

20. The method of claim 17, further comprising:
   forming the macro image utilizing binary thresholding based, at least in part, on pointer vector positions.

* * * * *